United States Patent [19]
Blomstrom et al.

[11] 3,899,218
[45] Aug. 12, 1975

[54] COMBINED INTEGRAL COMPONENT ENCLOSURE AND TRACK ROLLER FRAME

[75] Inventors: Gary D. Blomstrom, Metamora; Lindell L. Miller, Plano; Lyle E. York, Peoria, all of Ill.

[73] Assignee: Caterpillar Tractor Co., Peoria, Ill.

[22] Filed: Dec. 26, 1973

[21] Appl. No.: 428,092

[52] U.S. Cl. .................................. 305/9; 305/60
[51] Int. Cl. ........................................ B62d 55/30
[58] Field of Search ............. 305/60, 30, 32, 25, 28, 305/16, 9; 180/9.52

[56] References Cited
UNITED STATES PATENTS
2,284,821  6/1942  Heaslet ................................. 305/9
2,599,592  6/1952  Stewart ................................. 305/9

*Primary Examiner*—Philip Goodman
*Attorney, Agent, or Firm*—Ralph E. Walters

[57] ABSTRACT

A combined integral component enclosure and track roller frame for a track-type vehicle includes an elongated inverted U-shaped housing with a tunnel forming bight portion and a pair of spaced leg portions, a plurality of elongated wall members individually secured to the leg portions of the housing and forming therewith a pair of substantially parallel box beams, and a stiffening cross plate disposed within the housing between the box beams to form a track roller frame having maximum strength and resistance to distortion.

5 Claims, 3 Drawing Figures

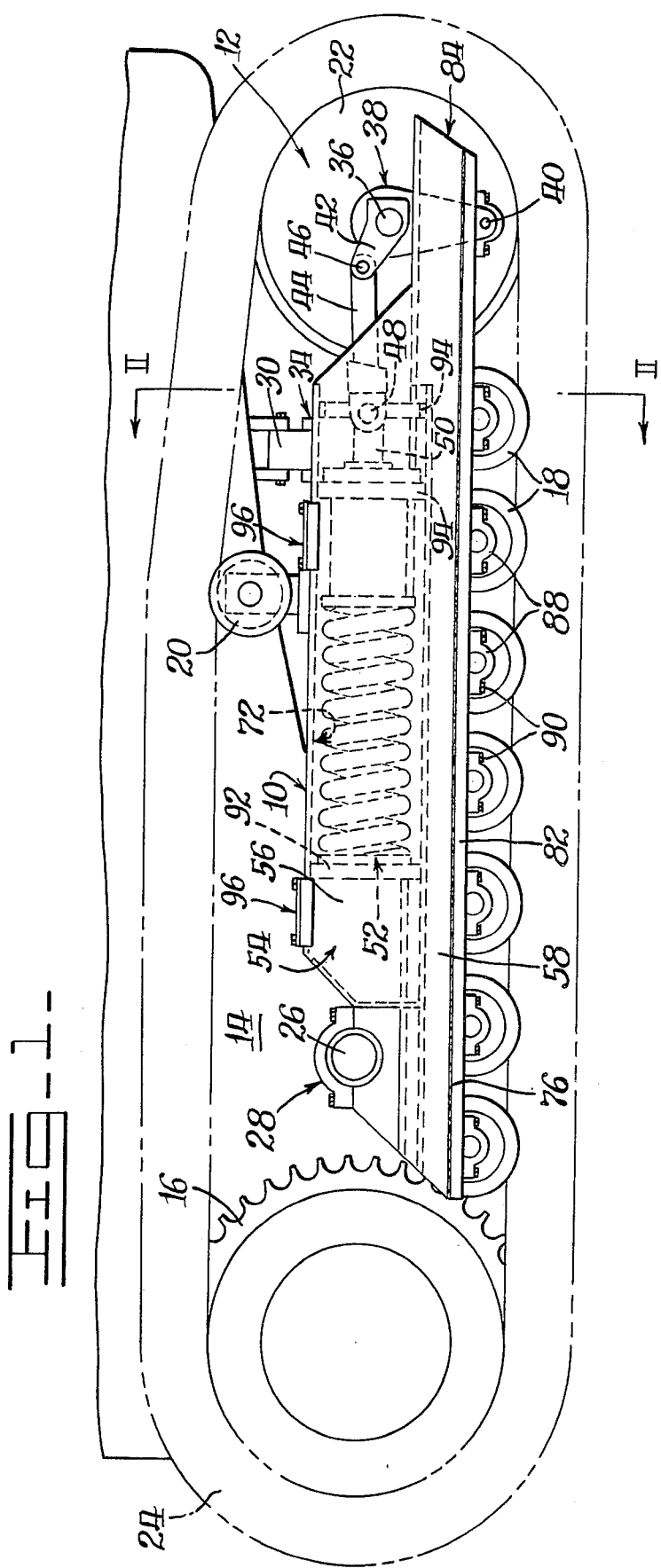

PATENTED AUG 12 1975  3,899,218
SHEET 2
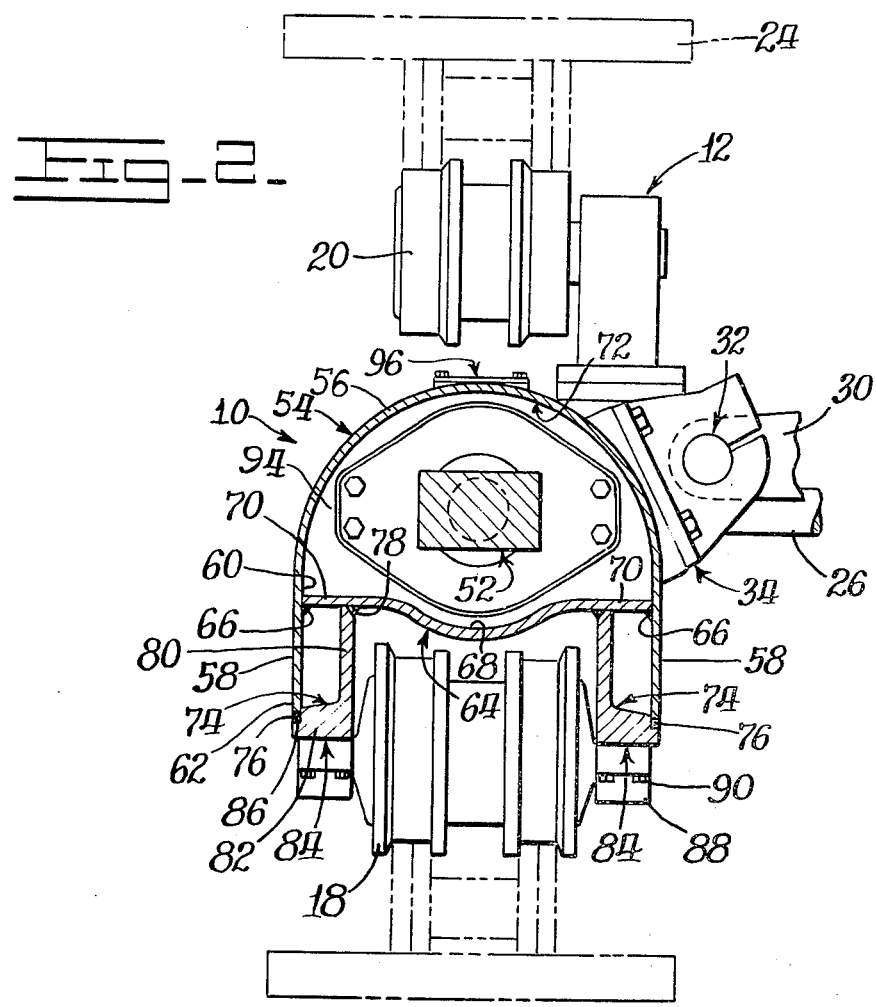
Fig-2-
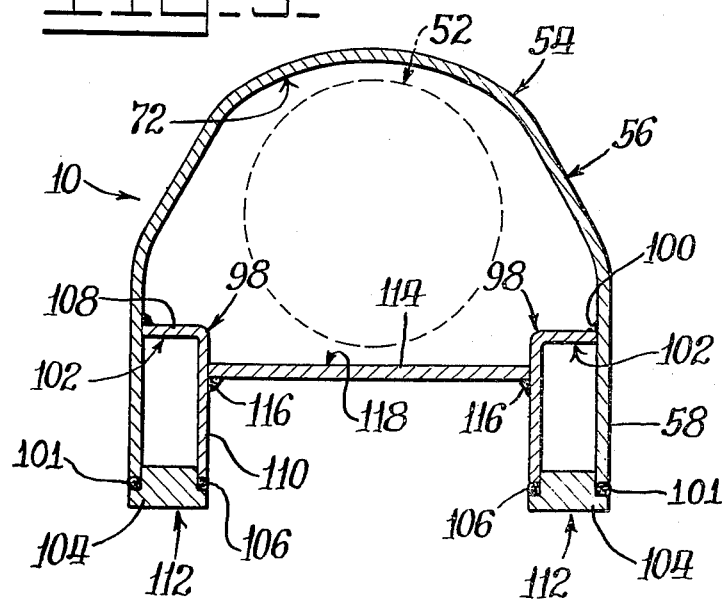
Fig-3-

COMBINED INTEGRAL COMPONENT ENCLOSURE AND TRACK ROLLER FRAME

BACKGROUND OF THE INVENTION

Track roller frames for track-type earthmoving vehicles or the like are subjected to extremely heavy stresses as the vehicle travels over uneven terrain. A pair of these frames are disposed in substantially parallel relation on opposite sides of the vehicle. Generally the frames individually pivotally support a driving sprocket, a front idler, a plurality of track rollers and an endless track chain trained about the sprocket and idler for circuitous movement therebetween.

More particularly, each of these frames usually includes a pair of longitudinally oriented box beams maintained in parallel relation by a series of separate interconnecting cross members. The rollers are transversely spannably secured to the bottom of such beams and a relatively light sheet metal cover encloses the usual idler recoil mechanism. Such typical construction is represented by U.S. Pat. No. 2,049,672 to O. L. Starr assigned to the assignee of the present invention. With the trend, however, to heavier machines and faster operating speeds, repetitive roller frame stresses of high magnitude have frequently resulted in extensive cracking of the various weld joints used to secure the elements of the frame together. In many cases this requires the immediate field services of a welder to avoid more extensive damage to the entire track frame assembly. In other cases the frames are permanently twisted to such an extent that unequal loads are placed on the rollers and support bearings, and this can ultimately lead to their premature failure. In still other cases projecting rocks or tree limbs extensively damage the light sheet metal covers that shield the recoil mechanism.

Further reference is made to U.S. Pat. No. 2,926,969 to W. M. Ashley, Jr., and U.S. Pat. No. 2,991,132 to D. N. Schwartz et al, relating to other track roller frame configurations which may better resist the aforementioned field service problems. However, these frames are relatively expensive to manufacture and still do not offer a sufficiently rugged frame section to resist severe loading. For example, such track roller frames incorporate overlapping, dual or excessively thick walls which do not provide a large enough roller frame section modulus for the quantity of material used, and thus are excessively costly to produce.

SUMMARY AND OBJECTS OF THE INVENTION

It is, therefore, an object of the present invention to provide an improved combined integral component enclosure and track roller frame for a track-type vehicle having maximum strength and resistance to distortion.

Another object of the invention is to provide such an improved combined integral component enclosure and track roller frame affording improved protection to other associated track components of the vehicle.

Another object of the invention is to provide an improved combined integral component enclosure and track roller frame of the character described which may be economically manufactured and conveniently serviced.

BRIEF DESCRIPTION OF THE DRAWINGS

FIG. 1 is a side elevation of a track-type vehicle undercarriage assembly incorporating the combined integral component enclosure and track roller frame of the present invention with portions of a recoil mechanism shown therein in dashed lines for illustrative convenience.

FIG. 2 is a transverse vertical section through the combined integral component enclosure and track roller frame of the present invention taken along the line II—II of FIG. 1.

FIG. 3 is a transverse vertical section of an alternate embodiment of the combined integral component enclosure and track roller frame of the present invention.

DESCRIPTION OF THE PREFERRED EMBODIMENT

With reference to FIGS. 1 and 2 of the drawings, a combined integral component enclosure and track roller frame 10 incorporates the features of the present invention. Such track roller frame serves as the major carrier portion of a track-type undercarriage assembly identified generally by the reference numeral 12. A pair of these undercarriage assemblies are arranged in parallel relation on either side of a vehicle body 14 in supporting relation thereto, and each includes a reversible driving sprocket 16 pivotally secured to the rear of the vehicle body, a plurality of track rollers 18, a carrier roller 20, and a front idler 22. An endless track chain assembly 24 is trained for circuitous movement in the usual manner about the sprocket and idler in peripheral engagement with the rollers.

As best shown in FIG. 1, the vehicle body 14 is rearwardly supported on the track roller frame 10 by a transversely disposed support pin 26 which is pivotally embraced by a bracket assembly 28 secured to the track roller frame. The vehicle body is supported forwardly thereof on a transversely arranged rockable equalizer bar 30 connected by a universal coupling joint 32 to a bracket assembly 34 secured to the track roller frame, as best shown in FIG. 2.

In order to apply proper tension to the endless track chain assembly 24 and to allow obstacles in the path of movement to be traversed with a minimum of shock to the undercarriage assembly 12, the front idler 22 is supported for rotatable movement on a pivot pin 36 and for axial rocking movement by a pair of pin-supporting carriages 38 disposed on either side of the front idler. The carriages 38 are individually pivotally connected as at 40 to the track roller frame 10, and each has a rearwardly inclined arm 42 connected to a yoke assembly 44 by a pivot pin 46. The yoke assembly is rearwardly pivotally secured to a transverse pin 48 which is carried by a connecting rod 50 resiliently axially loaded by a recoil mechanism 52. Reference is made to U.S. Pat. No. 2,017,729 to N. O. Panzegrau et al for details of such a rockable front idler and associated recoil mechanism.

As shown in FIG. 2, the track roller frame 10 of the present invention is of fabricated construction including an elongated inverted U-shaped housing 54, having a tunnel forming bight portion 56 and a pair of depending spaced leg portions 58 individually provided with an intermediate surface portion 60 and a lower surface portion 62. The track roller frame also includes an elongated cross plate 64 oppositely marginally secured to the intermediate surface portion of the leg portion of the housing by a pair of longitudinal welds 66. The cross plate also includes a centrally disposed elongated depression 68 and opposite marginal portions 70 which serve not only to increase the transverse stiffness of the track roller frame, but also to cooperate with the U-shaped housing to form a tunnel-like enclosure 72 which contains and protects the recoil mechanism 52.

The track roller frame 10 of the present invention also includes a pair of symmetrically oppositely outwardly facing L-shaped angle members 74 individually secured to the lower surface portions 62 of the leg portions 58 by a longitudinal weld 76 and a marginal portion 70 of the cross plate 64 by a longitudinal weld 78. Each of the L-shaped angle members includes an internal side wall member 80 and an integral bottom wall member 82 which cooperate with their respectively adjacent leg portions 58 and marginal portions 70 of the cross plate to form a substantially rigid box beam 84 on each leg portion 58 of the housing 54 of the track roller frame. It is significant that the leg portions between their intermediate surface portions 60 and their lower surface portions 62 form an external side wall for their respective box beams. Similarly, the marginal portions 70 of the cross plate form a top wall for the box beams. Each of the L-shaped angle members includes a marginally outwardly and upwardly facing stepped edge 86 adapted to receive its associated lower surface portion 62 of the leg portions 58 therein so that the welds 76, 62 of the leg portions and the bottom wall members 82 provide a relatively planar exterior surface less susceptible to damage. Preferably, the bottom wall members 82 of the box beams have a substantial thickness or depth providing greater strength on which to mount the track rollers 18 upwardly thereagainst as by a pair of end caps 88 and a plurality of upwardly extending bolts 90 threadably engaged therein.

As best shown in FIG. 1, the tunnel-like enclosure 72 formed within the track roller frame 10 of the present invention is longitudinally bounded by a transversely disposed rear bulkhead 92 which is weldably secured within the housing 54 and receives the load of the recoil mechanism 52. Likewise, a plurality of transversely disposed and suitable apertured bracing plates 94 are weldably secured forwardly within the housing, and a plurality of covered access openings 96 are provided for the purpose of allowing convenient servicing of the recoil mechanism.

DESCRIPTION OF ALTERNATE EMBODIMENT

An alternate embodiment of the track roller frame 10 of the present invention is shown in FIG. 3 wherein the same reference numerals have been applied to components thereof which are identical to their corresponding components in the preferred embodiment described above. This alternate embodiment provides an inverted U-shaped housing 54 substantially identical to the housing of the first form and similarly includes a tunnel-forming bight portion 56 and a pair of depending spaced leg portions 58. A symmetrically oppositely outwardly facing pair of channel members 98 are individually secured to the leg portions of the housing by an upper longitudinal weld 100 and a lower longitudinal weld 101. Each channel member 98 includes an inverted L-shaped angle member 102 and an inverted T-shaped bottom wall 104 which are secured together by an inwardly disposed longitudinal weld 106. In this embodiment, the inverted L-shaped angle member 102 includes a top wall 108 and an internal side wall 110 which cooperate with the bottom wall 104 and the leg portion 58 to form a box beam 112 on each side of the track roller frame. The box beams 112 are thus similar to the box beams 84 of the preferred embodiment shown in FIG. 2 wherein the leg portions 58 of the housing 54 provide the external side walls of the box beams. In this embodiment also a cross plate 114, which is substantially flat, is spannably secured to the box beams 112 by a pair of marginally disposed longitudinal welds 116 at an elevationally lower level than the top walls 108. Such lower elevational level of the cross plate 114 forms a slight centrally disposed longitudinally oriented depression 118 providing substantial radial clearance for the cylindrical recoil mechanism 52 disposed within the housing 54.

Operation

While the construction and operation of the above described embodiments of the present invention are believed clearly apparent from the foregoing description, further amplification will subsequently be made in the following brief summary of such operation. With the structure of either embodiment, upon rotation of the sprocket 16, the track chain assembly 24 is powerably moved along the track rollers 18, upon the carrier roller 20, and over the front idler 22 to propel the vehicle. The weight of the vehicle body 14 is directed through the support pin 26 and equalizer bar 30 to each of the track roller frames 10, and in turn the loads are generally transmitted through the inverted U-shaped housings 54 to the parallel box beams 84. From the box beams these loads pass downwardly through the track rollers 18 through the track chain assembly and to the ground. Thus, vertical loads as well as lateral loads transmitted to the track rollers as the vehicle traverses uneven terrain are transmitted through the box beams, and particularly through the leg portions 58 which form the outer walls thereof. For example, the loads acting downwardly from the equalizer bar 30 on the bracket assembly 34 are proportionately distributed by the bight portion 56 of the housing 54 downwardly through both leg portions. The utilization of the leg portions of the housing 54 as the outer walls of the box beams 84 or 112 is a significant feature of the present invention. Such unitized structure combines with the marginally secured cross plates 64 or 114 to provide a relatively large section modulus as well as a substantial depth of in cross section for the track roller frame 10. Calculations have indicated that the improved track roller frame of the present invention substantially doubles the overall strength of the frame from that of known prior devices and increases its torsional resistance by over ten times when compared to conventional track frames such as shown in the aforementioned U.S. Pat. No. 2,049,672 which utilizes sheet metal covers that do not measurably contribute to the strength of the track roller frame. Such increased strength of the track roller frame affords improved protection of the recoil mechanism contained therein, as well as stabilized loading of the track rollers 18 and the idler wheels 22.

The weldably fabricated nature of the track roller frame 10 of the present invention further features a relatively smooth or planar external surface minimizing external damage thereto by projecting rocks or tree limbs or the like. Prior art track roller frames on the other hand have many protruding bolt heads that are used to secure lighter sheet metal structures thereon and are subject to being snagged and damaged with resultant damage to the adjacent portions of the track roller frame.

Not only does the track roller frame 10 of the present invention afford maximum resistance to severe loading by virtue of its substantial stiffness, but also it offers certain manufacturing advantages. For example, the U-shaped housing 54, the L-shaped angles 74, and the elongated cross plate 64, including the integral depression 68, may be rollably formed during their manufacture. These four parts are basically weldably secured together using only a minimum of longitudinal welds 66, 76 and 78. The use of such substantially rectilinear welds lends itself to low cost manufacturing techniques without the need for expensive jigs and fixtures, or for extensive manual labor at a variety of connecting points. In the alternate embodiment of the track roller frame, as shown in FIG. 3, the same advantages are apparent since each inverted T-shaped bottom wall 104 may also be rollably formed with only a minimum number of longitudinal welds 100, 101, 106 and 116 again being repaired.

While the invention has been described and shown with particular reference to the preferred embodiments, it will be apparent that variations might be possible that would fall within the scope of the present invention, which is not intended to be limited except as defined in the following claims.

What is claimed is:

1. A combined integral component enclosure and track roller frame, for a track-type vehicle supported thereon by a plurality of rollers mounted on the frame, with an endless track chain peripherally engaged with the rollers, and with a recoil mechanism applying tension to the track chain, comprising;

an elongated inverted U-shaped housing having a tunnel forming bight portion and a pair of spaced leg portions;

elongated roller mounting means including a pair of symmetrically oppositely outwardly facing L-shaped angle members and additional connector wall members individually secured to their respectively adjacent angled members in outwardly extended channnular forming relationship therewith for attachment to said leg portions of the housing forming therewith a pair of substantially parallel fully enclosed box beams; and an elongated cross-plate disposed within said housing substantially horizontally between said box beams to form a tunnel-like enclosure which contains and protects such recoil mechanism while also providing a track roller frame having maximum strength and resistance to distortion.

2. A combined integral component enclosure and track roller frame, for a track-type vehicle, comprising:

an elongated inverted U-shaped housing having a tunnel forming bight portion and a pair of spaced leg portions integrally providing a pair of external side walls;

elongated roller mounting means including a pair of top wall members and a pair of symmetrically oppositely outwardly facing L-shaped angle members integrally providing a pair of internal side walls and a pair of bottom wall members secured to said external side walls of the housing for forming therewith a pair of substantially parallel box beams; and stiffener means disposed within said housing between said box beams to form a track roller frame having maximum strength and resistance to distortion.

3. The combined integral component enclosure and track roller frame of claim 2 wherein said stiffener means is an elongated cross plate spannably formed as a unit with said top wall member of each box beam and which is marginally secured to said external side walls and said internal side walls.

4. A combined integral component enclosure and track roller frame, for a track-type vehicle, comprising;

an elongated inverted U-shaped housing having depending legs individually providing an intermediate portion and a lower surface portion;

an elongated cross plate oppositely marginally secured to said intermediate portion of each of said legs in generally horizontally bridging stiffening relation there-between thereby forming with said housing a track recoil mechanism receiving protective enclosure; and a pair of symmetrically disposed oppositely outwardly facing L-shaped angle members secured to said elongated cross plate and said lower surface portion of said legs and forming therewith a pair of substantially parallel elongated box beams for optimum strength and maximum resistance to distortion.

5. A combined integral component enclosure and track roller frame, for a track-type vehicle, comprising;

an elongated inverted U-shaped housing having depending legs individually providing an intermediate portion and a lower surface portion;

symmetrically disposed oppositely outwardly facing channel means individually secured to said intermediate and said lower surface portion of each of said legs and forming therewith a pair of substantially parallel elongated box beams; and an elongated cross plate oppositely marginally secured to said box beams in generally horizontal stiffening relation therebetween to form a recoil mechanism receiving protective enclosure while also providing a track roller frame having a substantial section modulus for improved strength.

* * * * *